US012350679B2

(12) United States Patent
Reed et al.

(10) Patent No.: US 12,350,679 B2
(45) Date of Patent: Jul. 8, 2025

(54) FLUID INTERFACE TO RECEIVE REMOVABLE CONTAINER

(71) Applicant: Life Technologies Corporation, Carlsbad, CA (US)

(72) Inventors: Mark Reed, Menlo Park, CA (US); Rui Zheng, Madison, CT (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 18/437,605

(22) Filed: Feb. 9, 2024

(65) Prior Publication Data

US 2024/0246082 A1 Jul. 25, 2024

Related U.S. Application Data

(63) Continuation of application No. 16/885,904, filed on May 28, 2020, now Pat. No. 11,904,321.

(60) Provisional application No. 62/854,924, filed on May 30, 2019.

(51) Int. Cl.
*B01L 3/00* (2006.01)

(52) U.S. Cl.
CPC ............... *B01L 3/523* (2013.01); *B01L 3/561* (2013.01); *B01L 2200/026* (2013.01); *B01L 2200/0689* (2013.01); *B01L 2200/16* (2013.01); *B01L 2300/04* (2013.01); *B01L 2300/08* (2013.01)

(58) Field of Classification Search
CPC .. B01D 47/123; B01D 47/125; B01D 47/126; B01D 47/127; B01D 47/128; B01L 3/523; B01L 3/561; B01L 3/565; B01L 2200/026; B01L 2300/046; B01L 3/563; B01L 3/567; B65D 47/123; B65D 47/125; B65D 47/126; B65D 47/127; B65D 47/128
See application file for complete search history.

(56) References Cited

U.S. PATENT DOCUMENTS

| | | | | |
|---|---|---|---|---|
| 4,924,922 | A | 5/1990 | Johnson | |
| 5,019,348 | A * | 5/1991 | Ohms | C07K 1/128 422/63 |
| 5,248,056 | A | 9/1993 | Shaw | |
| 6,375,315 | B1 | 4/2002 | Steinmetz et al. | |
| 10,427,928 | B2 * | 10/2019 | Roswech | B67D 7/0288 |
| 10,934,155 | B2 * | 3/2021 | Roswech | B67D 7/0266 |
| 11,214,478 | B2 * | 1/2022 | Roswech | B67D 7/0266 |

(Continued)

FOREIGN PATENT DOCUMENTS

| | | |
|---|---|---|
| EP | 0546832 A2 | 6/1993 |
| EP | 2746736 A1 | 6/2014 |
| EP | 3468717 A1 | 4/2019 |

OTHER PUBLICATIONS

PCT/US2016/050631, Search Report and Written Opinion, Dec. 5, 2016, 1-12.

*Primary Examiner* — Jill A Warden
*Assistant Examiner* — Dwayne K Handy

(57) ABSTRACT

A container includes a lower portion and a lid to connect with the lower portion. The lid includes a fluidic interface, a swing bar, and a counter structure disposed on an opposite side of the fluidic interface relative to the swing bar. The fluidic interface includes a first liquid port, a second liquid port, a gas port, and a seal ring disposed around the first liquid port, the second liquid port, and the gas port, the first liquid port disposed along a center axis of the container.

14 Claims, 7 Drawing Sheets

(56) References Cited

U.S. PATENT DOCUMENTS

| | | | | |
|---|---|---|---|---|
| 11,713,235 | B2 * | 8/2023 | Roswech ................ | B01L 3/502 141/4 |
| 2002/0185457 | A1 * | 12/2002 | Smith .................. | B04B 5/0414 210/806 |
| 2004/0158207 | A1 | 8/2004 | Hunn et al. | |
| 2005/0168540 | A1 | 8/2005 | Wilson et al. | |
| 2006/0169719 | A1 | 8/2006 | Bui | |
| 2009/0246085 | A1 | 10/2009 | Watson et al. | |
| 2010/0294276 | A1 | 11/2010 | Rindy et al. | |
| 2010/0324487 | A1 | 12/2010 | Lynch et al. | |
| 2017/0066642 | A1 * | 3/2017 | Roswech ................ | B01L 3/523 |
| 2020/0102200 | A1 | 4/2020 | Roswech et al. | |

* cited by examiner

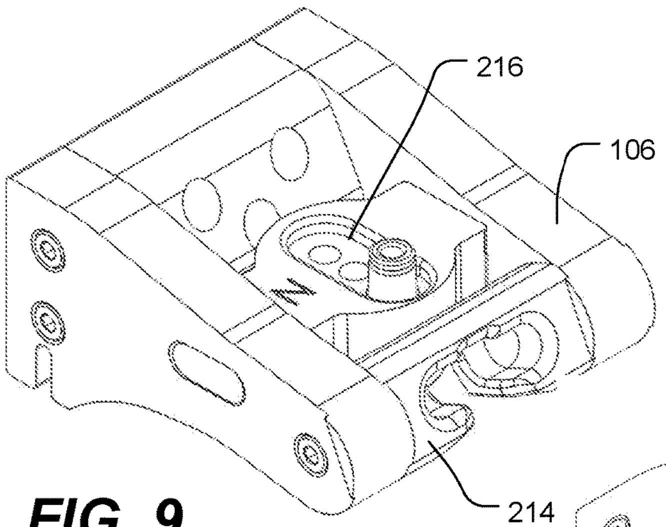
FIG. 9
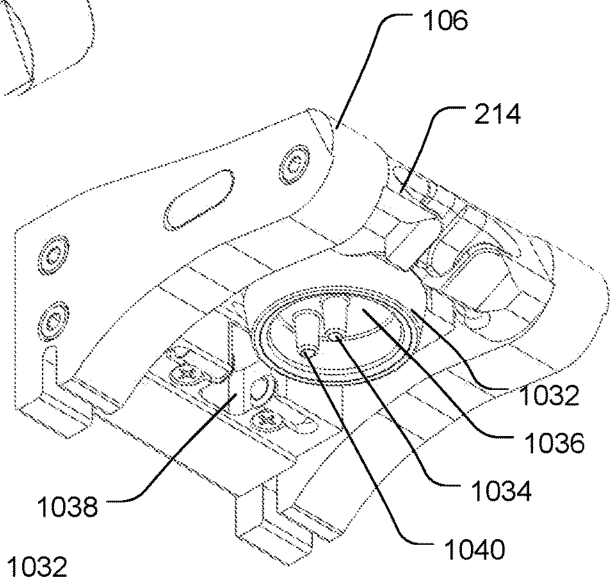
FIG. 10
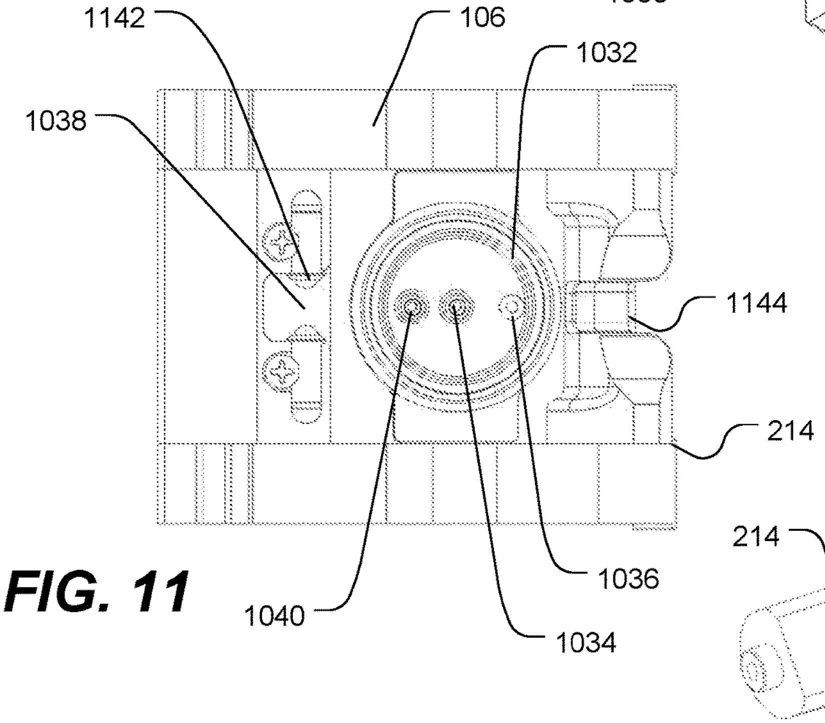
FIG. 11
FIG. 12
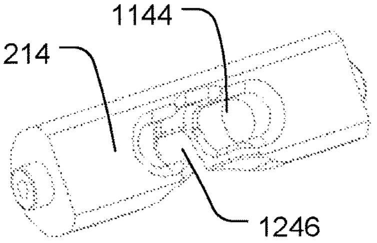

FLUID INTERFACE TO RECEIVE REMOVABLE CONTAINER

CROSS-REFERENCE TO RELATED APPLICATION(S)

This application is a continuation of U.S. patent application Ser. No. 16/885,904, filed May 28, 2020, which claims benefit of U.S. Provisional Application No. 62/854,924, filed May 30, 2019, each of which is incorporated herein by reference in its entirety.

FIELD OF THE DISCLOSURE

This disclosure, in general, relates to containers for liquid media and interfaces for attaching such containers to instruments.

BACKGROUND

Increasingly, laboratories are seeking instruments to perform testing of analytes. Preparation of such instruments can be labor-intensive, relying on the time-consuming preparation of reagent solutions. To reduce preparation times, industry is turning to pre-made reagent solutions provided to laboratory customers in kits. But, the shipping and handling of liquid reagents can lead to degradation of the reagent and spillage. As such, an improved reagent container and instrument interface would be desirable.

BRIEF DESCRIPTION OF THE DRAWINGS

The present disclosure may be better understood, and its numerous features and advantages made apparent to those skilled in the art by referencing the accompanying drawings.

FIG. 9, FIG. 10, and FIG. 11 include illustrations of example instrument side fluidics interfaces.

FIG. 12 includes an illustration of an example cradle portion of an instrument side fluidics interface.

The use of the same reference symbols in different drawings indicates similar or identical items.

DETAILED DESCRIPTION

In an embodiment, an instrument includes a fluidics interface to receive a removable container. The instrument side interface can include ports, such as liquid ports or a gas port. The removable container can include complementary ports, such as liquid ports and a gas port. In a particular example, a top of the container includes a swing bar to couple with a cradle of the instrument side fluidics interface. Once the swing bar and cradle are engaged, the container can swing into place to engage the fluidics interface of the instrument. In a particular example, the cradle is positioned outward from the instrument relative to the fluidics ports.

Figure 1:
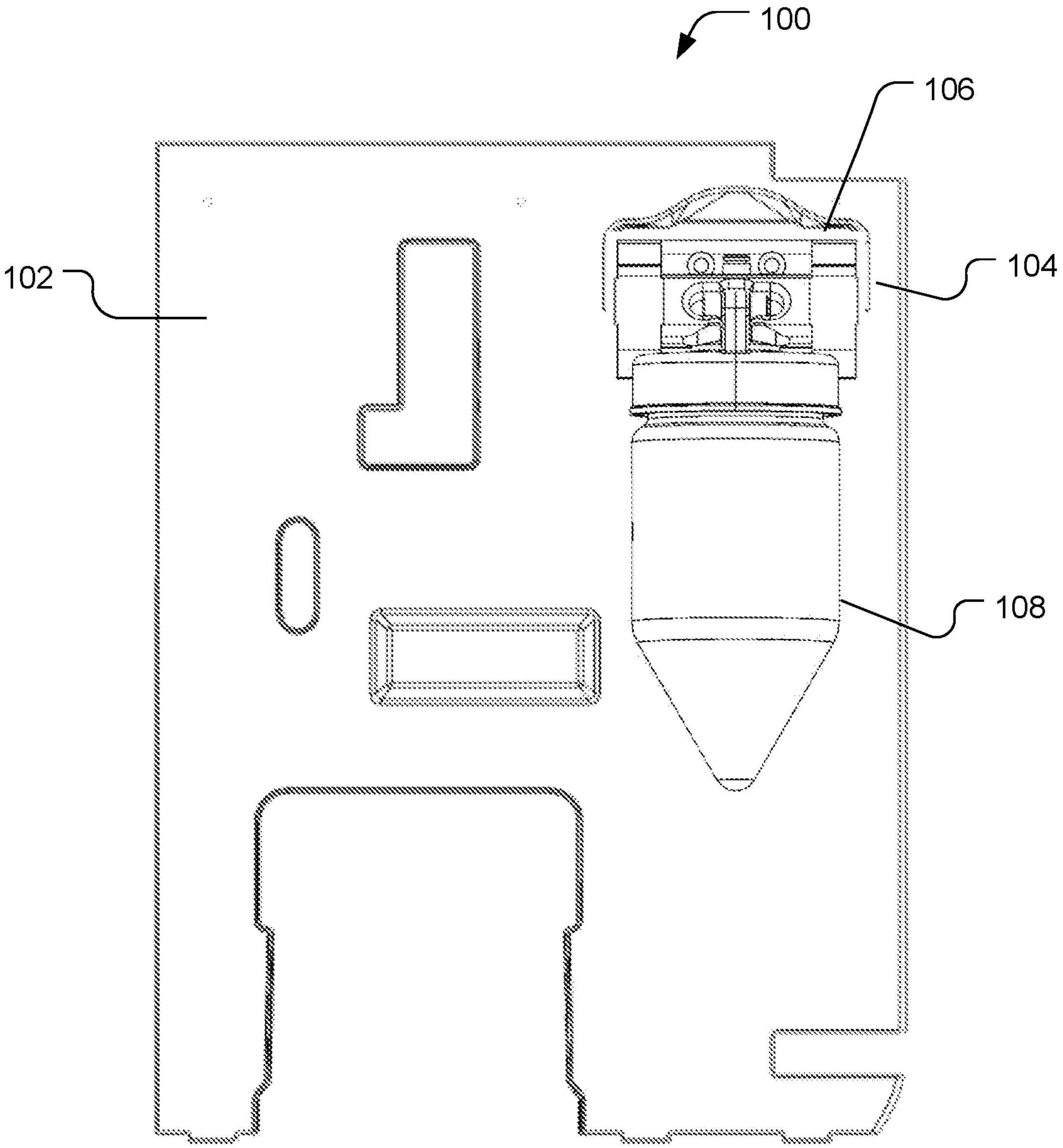
FIG. 1 includes an illustration of an example instrument panel for receiving a container.

In an example illustrated in FIG. 1, an instrument 100 can include a panel 102 having a recess 104 to receive a container 108. The container 108 can have a top configured to engage a fluidics interface 106 of the instrument 100.

Figure 2:
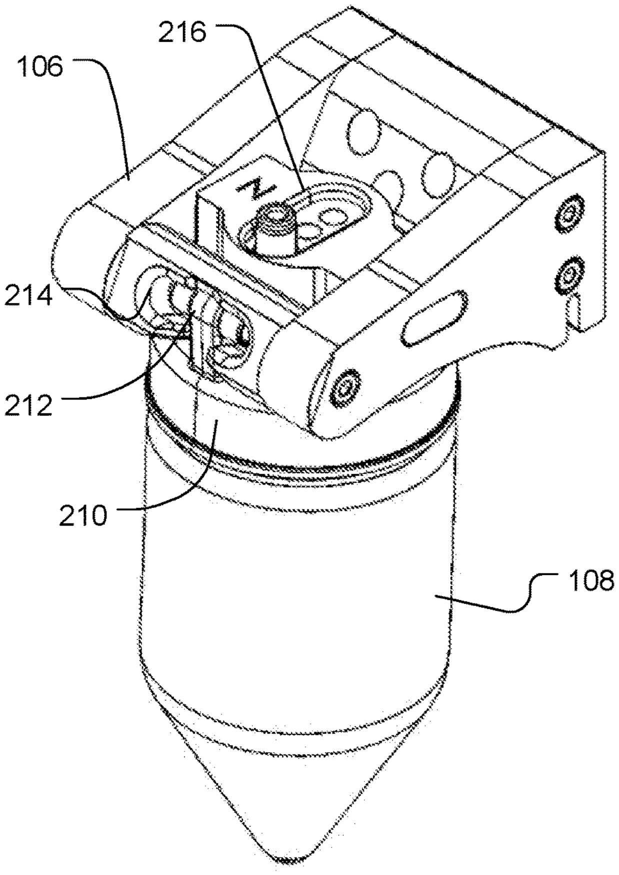
FIG. 2 and FIG. 3 include illustrations of an example container and instrument interface.
Figure 3:
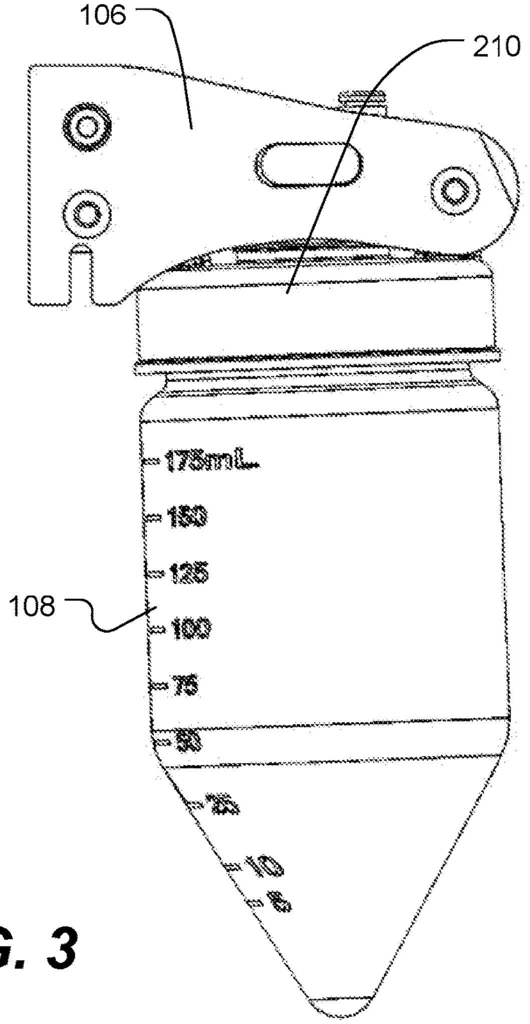

For example, as illustrated in FIG. 2 and FIG. 3, the fluidics interface 106 can engage a top or lid 210 of the container 108. In particular, a swing bar 212 of the top 210 of the container 108 can engage a cradle 214 of the fluidics interface 106. The container 108 can swing into place, engaging fluid manifold 216 of the fluidics interface 106 of the instrument.

Figure 4:
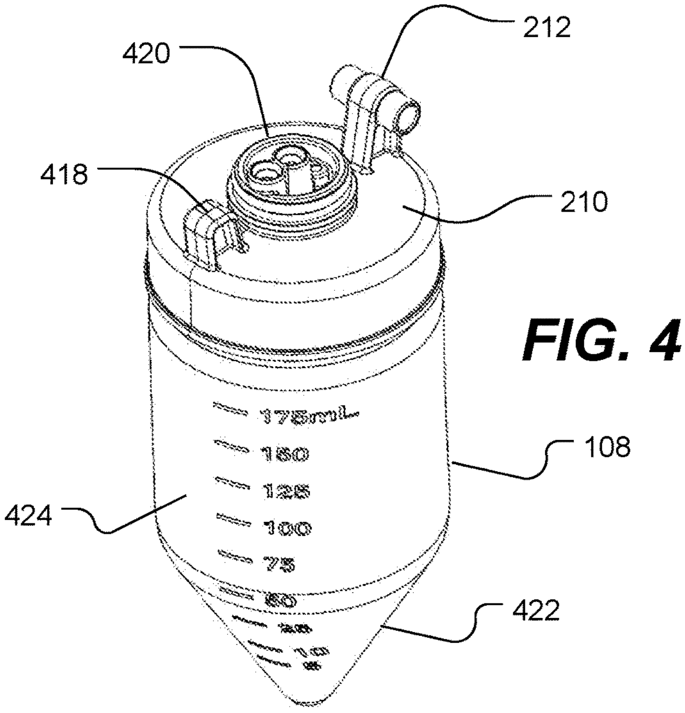
FIG. 4 includes an illustration of an example container.

In a particular example illustrated in FIG. 4, the container 108 can include a lower portion 424 and a top 210 having a fluidics interface 420. In an example, the top 210 can have a threaded connection to the lower portion 424. As illustrated, the fluidics interface 420 is axially centrally located along an axis of the container 108 and top 210. To one side of the fluidics interface 420 on the top 210 is positioned a swing bar 212, which can form part of the top 210. Optionally, opposite the swing bar 212 relative to the fluidics interface 420 is a counter structure 418.

In an example, the lower portion 424 of the container 108 can have a conical portion 422. In a further example, the lower portion 424 can include volume gradations.

Figure 5:
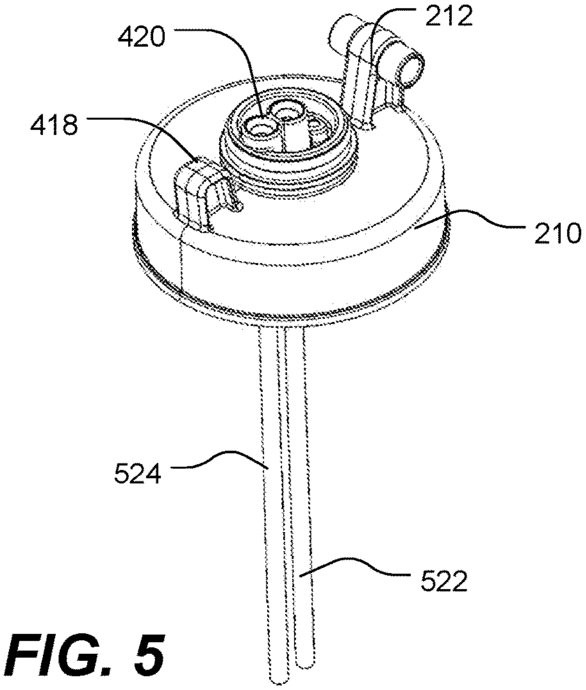
FIG. 5, FIG. 6, FIG. 7, and FIG. 8 include illustrations of an example top of a container.

Optionally, the top 210 of the container 108 can be connected to one or more sipper tubes 522 or 524 residing within the container 108, as illustrated in FIG. 5. In particular, a sipper tube 522 can extend axially central to the container 108. For example, the sipper tube 522 can extend into the conical potion 422 of the lower portion of the container 108. In another example, the sipper tube 524 can extend off axis and parallel to the central axis of the container 108. Optionally, the sipper tube 524 can extend into the conical portion 422. The sipper tube 522 can be longer than the sipper tube 524.

Figure 6:
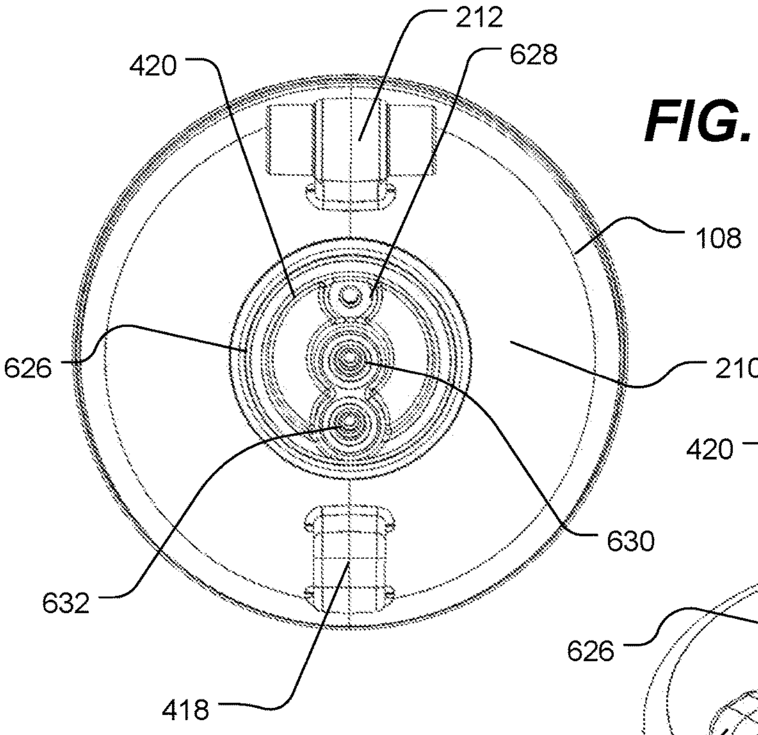
Figure 7:
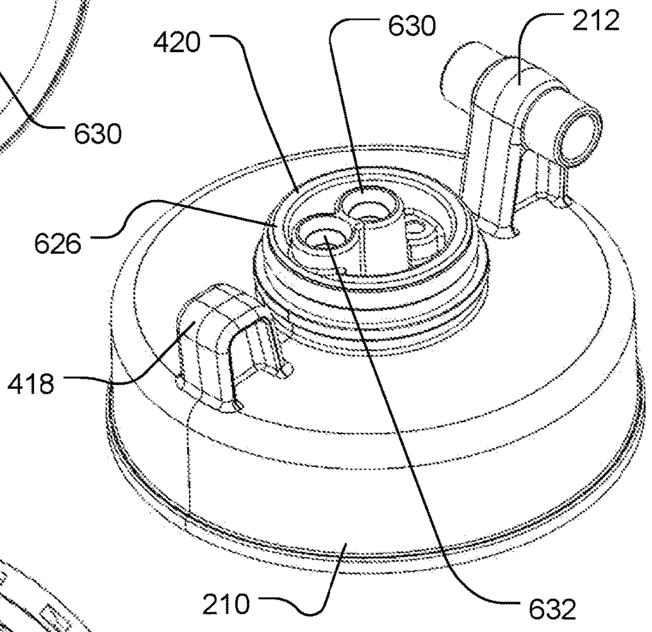
Figure 8:
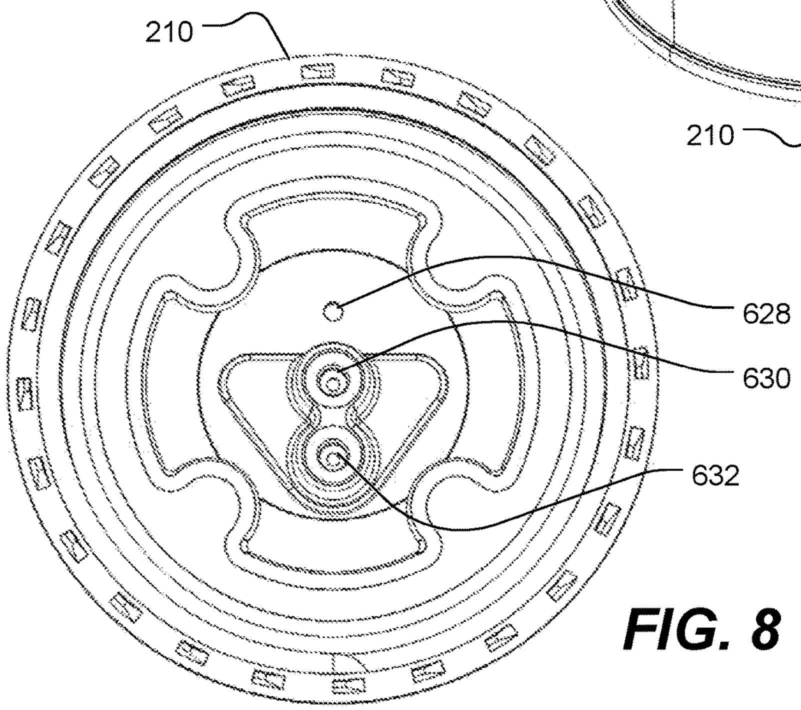

As illustrated in more detail in FIG. 6, FIG. 7, and FIG. 8, the top 210 of the container 108 includes the fluidics interface 420 centrally located along an axis of the container 108, and optionally concentric with the top 210. When viewed from above, as illustrated in FIG. 6, the swing bar 212 is disposed on an opposite side of the fluidics interface 420 from a counter structure 418. For example, a line can extend across the upper surface of the top 210 through the center of the swing bar 212, the fluidics interface 420, and the counter structure 418.

As illustrated in FIG. 6 and FIG. 7, the fluid interface 420 can include a peripheral sealing ring 626. A liquid port 630 comprising a raised sealing structure can be disposed at an axial center of the fluidics interface 420 and an axial center of the container 108. The raised sealing structure can be taller than the sealing ring 626. In another example, the raised sealing structure can be equal in height or shorter than the sealing ring 626. A second liquid port 632 comprising a raised sealing structure can be disposed within the sealing ring 626 and off the axial center of the fluidics interface 420 and container 108. In an example, the second liquid port 632 can be disposed along the line extending across the upper surface of the top 210 through the center of the swing bar 212 and the counter structure 418. In a particular example, the second liquid port 632 can be positioned along the line closer to the counter structure 418 than the liquid port 630. As illustrated, the raised sealing structure of the second liquid port 632 can be equal in height to the raised sealing structure of the liquid port 630. In another example, the raised sealing structure of the second liquid port 532 can be shorter than the raised sealing structure of the liquid port 630.

In an example, a gas port 628 can be disposed to a side of the liquid port 630 and within the boundary of the sealing ring 626. In an example, the gas port 628 is disposed within the sealing ring closer to the swing bar 212 than the liquid port 630. Optionally, the gas port 628 has a raised sealing structure. In an example, the raised sealing structure is shorter than the sealing ring 626 and shorter than the raised sealing structure of the liquid port 630.

As illustrated in FIG. 8, an underside of the top can include an opening to the liquid port 630 centrally located, with an opening to the second liquid port 632 to one side and an opening to the gas port 628 on an opposite side, optionally along the line extending from the swing bar 212 and the counter structure 418. The openings of the liquid port 630 and the liquid port 632 can be configured to receive sipper tubes 522 and 524.

Such a configuration of the top 210 of the container 108 and the associated liquid and gas ports can effectively receive a complementary lid during shipping. Such a configuration can limit fluid leakage.

FIG. 9, FIG. 10, and FIG. 11 include illustrations of an example instrument side fluidics interface 106. The fluidics interface 106 includes a cradle 214 and a fluidics port 216. In particular, the cradle 214 is disposed further from the instrument panel than the fluidics port 216.

As illustrated in FIG. 10, the fluidics interface 106, when viewed from an underside, includes a sealing structure 1032 to engage the sealing ring 626 of the container 108. In an example, a liquid port 1034 extends and can engage or enter the liquid port 630 of the container 108. Alternatively, the liquid port 630 of the container can enter the liquid port 1034 of the fluidics interface 106. In an example, a liquid port 1040 extends and can engage or enter the liquid port 632 of the container 108. Alternatively, the liquid port 632 of the container can enter the liquid port 1040 of the fluidics interface 106. Optionally, a gas port 1036 can be provided to access the gas port 628 of the container 108 by virtue of the seals formed between the rings 1032 and 626, as well as the seal formed by the liquid ports 1034 and 630 and 1040 and 632.

As further illustrated in FIG. 10, the fluidics interface 106 can include a recess 1038 to receive the counter structure 418 of the top 210 of the container 108. As illustrated in FIG. 11, connectors 1142, such as detents, can be positioned on one or both sides of the recess 1038 and can releasably secure the counter structure 418 in place.

As further illustrated in FIG. 11, the cradle 214 includes a recess 1144 to receive the swing bar 212. For example, as illustrated in FIG. 12, the cradle 214 includes a recess 1144 and a slot 1246 to receive the swing bar 212 of the container 108 and allow the container 108 to swing towards the instrument and engage the connectors 1142 and the fluidics ports 1034, 1036, and 1040.

In use, the swing bar 212 of the top 210 of the container 108 can engage the cradle 214 of the fluidics interface 106 at an angle. The container 108 can then swing around a pivot formed by the cradle 214 and swing bar 212 into the recess 104 of the instrument 100. The counter structure 418 can engage the recess 1038 and optional connectors 1142. In a particular example, the weight of the bottle and optional connection to the connectors 1142 forms a leak-tight seal between the fluidics ports 420 of the container 108 and the fluid manifold of the fluidics interface 106. For example, the interface 106 can be angled relative to a direction of gravity to allow the weight of the container 108 to form the fluidics interface 420 against the ring 1032. To disengage the container 108, the process can be reversed.

In an example, a liquid reagent can be added to the container 108 through the liquid ports 1040 and 632. Optionally, an inert gas or air can be applied through the gas ports and into the container 108. The liquid reagent solution within the container can be drawn or pushed through the liquid port 630 and into the instrument 100. For example, the inert gas or air can push the liquid reagent solution through the liquid port 630 and into the instrument 100.

While the examples illustrated herein include a cradle in the instrument side fluidics interface and a swing bar on the top of the container, the container can alternatively include the cradle and the instrument side fluidics interface the swing bar. In another alternative example, the positioning of the liquid port and the gas port can be reversed or can be disposed in different positions with different male or female configurations.

Figure 13:
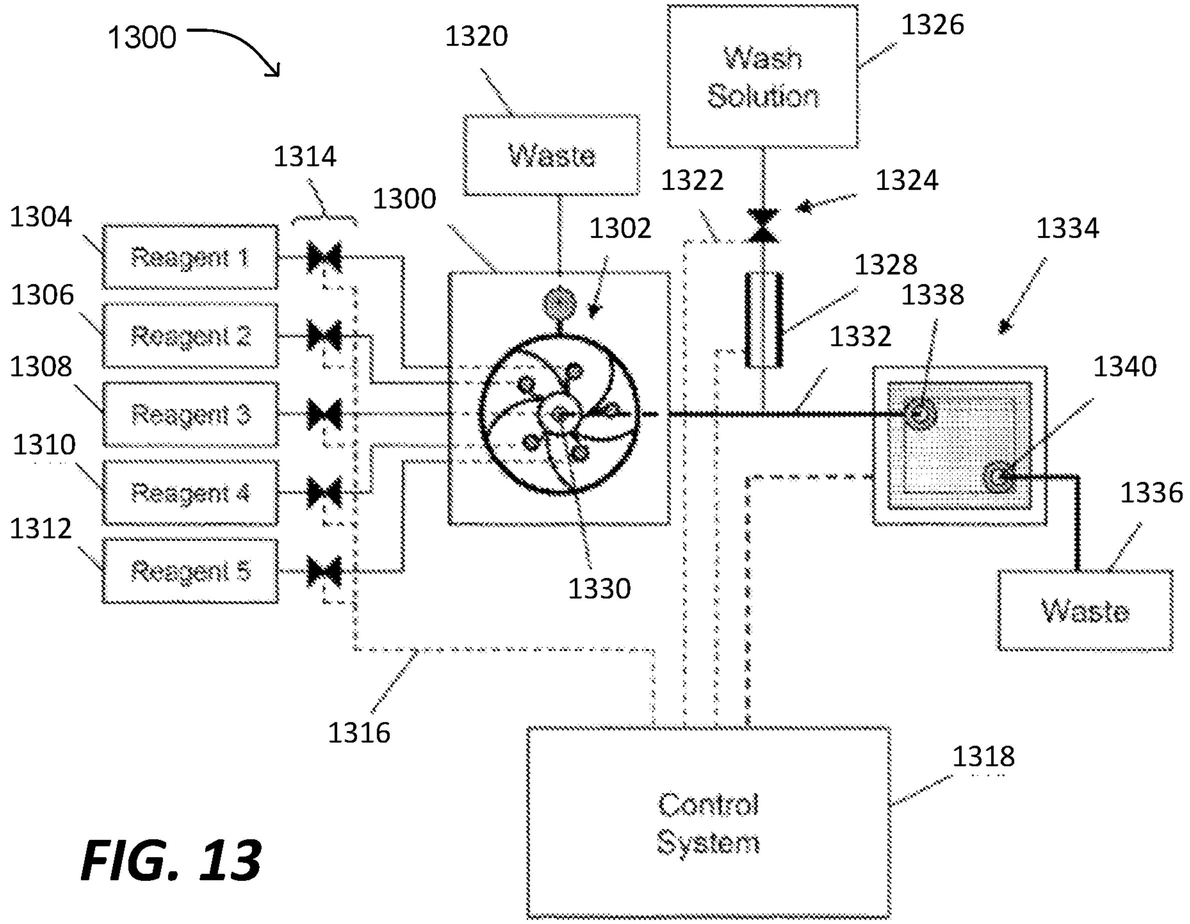
FIG. 13 includes an illustration of an example sequencing system.

The fluidics interface and container find particular use in a sequencing system. FIG. 13 diagrammatically illustrates a system for carrying out pH-based nucleic acid sequencing. Each electronic sensor of the apparatus generates an output signal that depends on the value of a reference voltage. The fluid circuit permits multiple reagents to be delivered to the reaction chambers.

In FIG. 13, system 1300 containing fluidics circuit 1302 is connected by inlets to at least two reagent reservoirs (1304, 1306, 1308, 1310, or 1312), to waste reservoir 1320, and to biosensor 1334 by fluid pathway 1332 that connects fluidics node 1330 to inlet 1338 of biosensor 1334 for fluidic communication. Reagents from reservoirs (1304, 1306, 1308, 1310, or 1312) can be driven to fluidic circuit 1302 by a variety of methods including pressure, pumps, such as syringe pumps, gravity feed, and the like, and are selected by control of valves 1314. Reagents from the fluidics circuit 1302 can be driven through the valves 1314 receiving signals from control system 1318 to waste container 1320. Reagents from the fluidics circuit 1302 can also be driven through the biosensor 1334 to the waste container 1336. The control system 1318 includes controllers for valves, which generate signals for opening and closing via electrical connection 1316.

The control system 1318 also includes controllers for other components of the system, such as wash solution valve 1324 connected thereto by electrical connection 1322, and reference electrode 1328. Control system 1318 can also include control and data acquisition functions for biosensor 1334. In one mode of operation, fluidic circuit 1302 delivers a sequence of selected reagents 1, 2, 3, 4, or 5 to biosensor 1334 under programmed control of control system 1318, such that in between selected reagent flows, fluidics circuit 1302 is primed and washed, and biosensor 1334 is washed. Fluids entering biosensor 1334 exit through outlet 1340 and are deposited in waste container 1336 via control of pinch valve regulator 1344. The valve 1344 is in fluidic communication with the sensor fluid output 1340 of the biosensor 1334.

Figure 14:
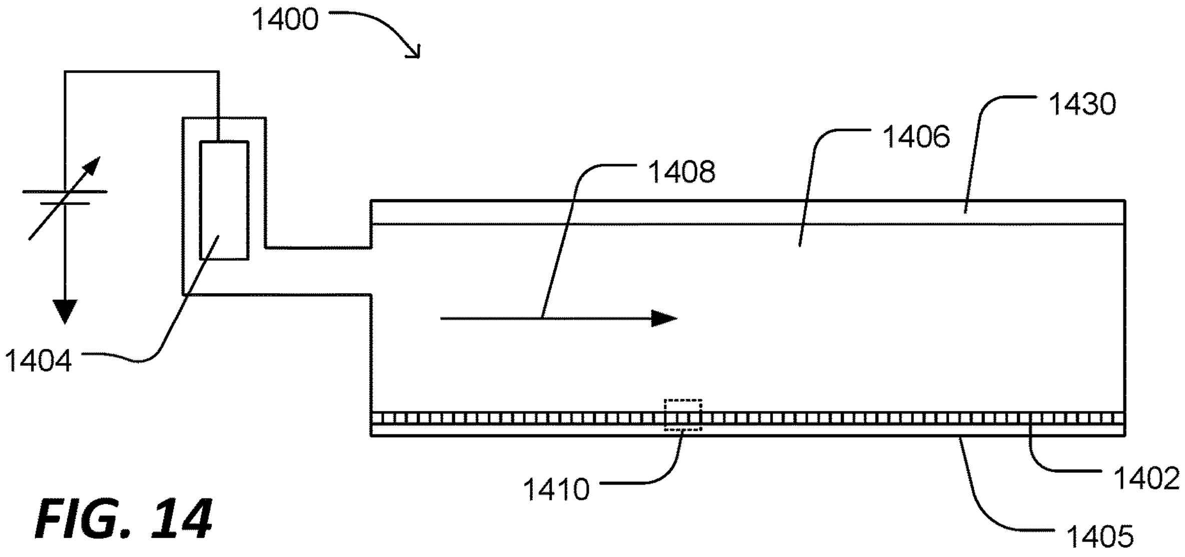
FIG. 14 includes an illustration of an example system including a sensor array.

The device including the dielectric layer defining the well formed from the first access and second access and exposing a sensor pad finds particular use in detecting chemical reactions and byproducts, such as detecting the release of hydrogen ions in response to nucleotide incorporation, useful in genetic sequencing, among other applications. In a particular embodiment, a sequencing system includes a flow cell in which a sensory array is disposed, includes communication circuitry in electronic communication with the sensory array, and includes containers and fluid controls in fluidic communication with the flow cell. In an example, FIG. 14 illustrates an expanded and cross-sectional view of a flow cell 1400 and illustrates a portion of a flow chamber 1406. A reagent flow 1408 flows across a surface of a well array 1402, in which the reagent flow 1408 flows over the open ends of wells of the well array 1402. The well array 1402 and a sensor array 1405 together may form an integrated unit forming a lower wall (or floor) of flow cell 1400. A reference electrode 1404 may be fluidly coupled to flow chamber 1406. Further, a flow cell cover 1430 encapsulates flow chamber 1406 to contain reagent flow 1408 within a confined region.

Figure 15:
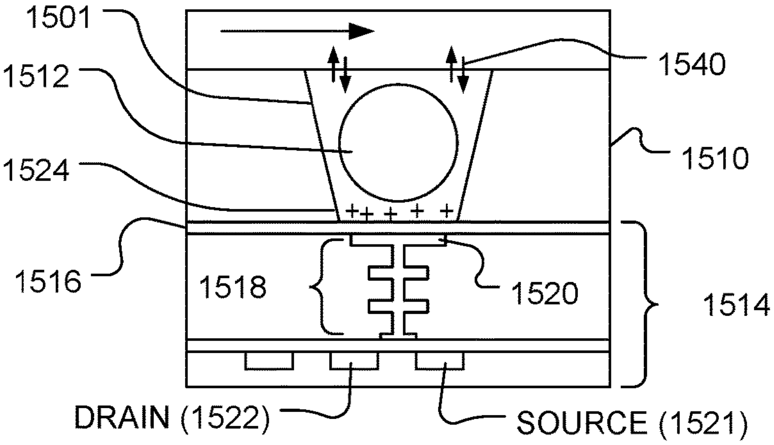
FIG. 15 includes an illustration of an example sensor and associated well.

FIG. 15 illustrates an expanded view of a well 1501 and a sensor 1514, as illustrated at 1410 of FIG. 14. The volume, shape, aspect ratio (such as base width-to-well depth ratio), and other dimensional characteristics of the wells may be selected based on the nature of the reaction taking place, as well as the reagents, byproducts, or labeling techniques (if any) that are employed. The sensor 1514 can be a chemical field-effect transistor (chemFET), more specifically an ion-sensitive FET (ISFET), with a floating gate 1518 having a sensor plate 1520 optionally separated from the well interior by a passivation layer 1516. The sensor 1514 can be responsive to (and generate an output signal related to) the amount of a charge 1524 present on passivation layer 1516 opposite the sensor plate 1520. Changes in the charge 1524 can cause changes in a current between a source 1521 and a drain 1522 of the chemFET. In turn, the chemFET can be used directly to provide a current-based output signal or indirectly with additional circuitry to provide a voltage-based output signal. Reactants, wash solutions, and other reagents may move in and out of the wells by a diffusion mechanism 1540.

In an embodiment, reactions carried out in the well 1501 can be analytical reactions to identify or determine characteristics or properties of an analyte of interest. Such reactions can generate directly or indirectly byproducts that affect the amount of charge adjacent to the sensor plate 1520. If such byproducts are produced in small amounts or rapidly decay or react with other constituents, then multiple copies of the same analyte may be analyzed in the well 1501 at the same time in order to increase the output signal generated. In an embodiment, multiple copies of an analyte may be attached to a solid phase support 1512, either before or after deposition into the well 1501. The solid phase support 1512 may be microparticles, nanoparticles, beads, solid or porous comprising gels, or the like. For simplicity and ease of explanation, solid phase support 1512 is also referred herein as a particle or bead. For a nucleic acid analyte, multiple, connected copies may be made by rolling circle amplification (RCA), exponential RCA, or like techniques, to produce an amplicon without the need of a solid support.

In a first aspect, a container includes a lower portion and a lid to connect with the lower portion. The lid includes a fluidic interface, a swing bar, and a counter structure disposed on an opposite side of the fluidic interface relative to the swing bar. The fluidic interface includes a first liquid port, a second liquid port, a gas port, and a seal ring disposed around the first liquid port, the second liquid port, and the gas port, the first liquid port disposed along a center axis of the container.

In an example of the first aspect, the second liquid port is disposed along a line extending from a center of the swing bar to the counter structure through the first liquid port. For example, the second liquid port is closer to the counter structure than the swing bar. In another example, the gas port is disposed along the line closer to the swing bar.

In another example of the first aspect and the above examples, the container further includes a sipper tube connected to the first liquid port and extending into the lower portion. For example, the container further includes a second sipper tube connected to the second liquid port and extending into the lower portion. In another example, the second sipper tube is shorter than the sipper tube.

In a further example of the first aspect and the above examples, the lower portion has a conical section.

In an additional example of the first aspect and the above examples, the first liquid port includes a raised seal structure. In another example, the raised sealing structure is taller than the sealing ring. For example, the second liquid port has a second raised sealing structure. In an example, the second raised sealing structure is the same height as the raised sealing structure of the first liquid port. In another example, the gas port includes a third raised sealing structure. For example, the third raised sealing structure is shorter than the raised sealing structure of the first liquid port.

In another example of the first aspect and the above examples, the lid connects to the lower portion with a threaded connection.

In a second aspect, a fluidic interconnect includes an instrument interface including a cradle, and an instrument fluidic interface including an instrument sealing ring and a first instrument liquid port, a second instrument liquid port, and an instrument gas port disposed within the instrument sealing ring. The fluidic interconnect further includes a container including a lower portion and a lid to connect with the lower portion. The lid includes a fluidic interface, a swing bar, and a counter structure disposed on an opposite side of the fluidic interface relative to the swing bar. The fluidic interface includes a first liquid port, a second liquid port, a gas port, and a seal ring disposed around the first liquid port, the second liquid port, and the gas port. The first liquid port is disposed along a center axis of the container. The instrument fluidic interface and the fluidic interface of the lid connects to engage the first instrument liquid port to the first liquid port, the second instrument liquid port to the second liquid port, and the instrument gas port to the gas port, when the swing bar engages the cradle.

In an example of the second aspect, the instrument interface further includes a recess to receive the counter structure of the lid. For example, the instrument interface further includes connectors to engage the counter structure of the lid.

In another example of the second aspect and the above examples, the second liquid port is disposed along a line extending from a center of the swing bar to the counter structure through the first liquid port. For example, the second liquid port is closer to the counter structure than the swing bar. In an example, the gas port is disposed along the line closer to the swing bar.

In a further example of the second aspect and the above examples, the fluidic interconnect further includes a sipper tube connected to the first liquid port and extending into the lower portion. For example, the fluidic interconnect further includes a second sipper tube connected to the second liquid port and extending into the lower portion. For example, the second sipper tube is shorter than the sipper tube.

In an additional example of the second aspect and the above examples, the lower portion has a conical section.

In another example of the second aspect and the above examples, the first liquid port includes a raised seal structure. In an example, the raised sealing structure is taller than the sealing ring. For example, the second liquid port has a second raised sealing structure. In an additional example, the second raised sealing structure is the same height as the raised sealing structure of the first liquid port. For example, the gas port includes a third raised sealing structure. In another example, the third raised sealing structure is shorter than the raised sealing structure of the first liquid port.

In further example of the second aspect and the above examples, the lid connects to the lower portion with a threaded connection.

In a third aspect, a method of connecting a container to an instrument includes applying a swing bar of a container to a cradle of an instrument interface. The instrument interface includes the cradle, and an instrument fluidic interface including an instrument sealing ring and a first instrument liquid port, a second instrument liquid port, and an instrument gas port disposed within the instrument sealing ring. The container includes a lower portion and a lid to connect with the lower portion. The lid includes a fluidic interface, the swing bar, and a counter structure disposed on an opposite side of the fluidic interface relative to the swing bar. The fluidic interface includes a first liquid port, a second liquid port, a gas port, and a seal ring disposed around the first liquid port, the second liquid port, and the gas port, the first liquid port disposed along a center axis of the container. The method further includes applying gas through the gas port to drive liquid from container through the liquid ports into the instrument.

In an example of the third aspect, the method further includes swinging the container to apply the counter structure into a recess of the instrument interface. In another example, the method further includes applying a reagent solution through the second instrument port and the second liquid port into the container.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of “a” or “an” are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of connecting a container to an instrument, the method comprising:

- applying a swing bar of a container to a cradle of an instrument interface, wherein:
  - the instrument interface including the cradle, and an instrument fluidic interface including an instrument sealing ring and a first instrument liquid port, a second instrument liquid port, and an instrument gas port disposed within the instrument sealing ring; and
  - the container including:
    - a lower portion having a cylindrical section and a conical section;
    - a lid to connect with the cylindrical section of the lower portion, the lid including a fluidic interface, a swing bar, and a counter structure disposed on an opposite side of the fluidic interface relative to the swing bar, the fluidic interface including a first liquid port, a second liquid port, a gas port, and a seal ring disposed around the first liquid port, the second liquid port, and the gas port, the first liquid port disposed along a center axis of the container;
    - a first sipper tube connected to the first liquid port and extending into the lower portion; and
    - a second sipper tube connected to the second liquid port and extending into the lower portion, wherein the second sipper tube is shorter than the first sipper tube;
  - applying a reagent solution through the second instrument liquid port, the second liquid port, and the second sipper tube into the container; and
- applying gas through the gas port to drive the reagent solution from the container through the first liquid sipper tube, the first liquid port, and the first instrument liquid port into the instrument.

2. The method of claim 1, further comprising swinging the container to apply the counter structure into a recess of the instrument interface.

3. The method of claim 1, wherein the instrument interface further includes a recess to receive the counter structure of the lid.

4. The method of claim 3, wherein the instrument interface further includes connectors to engage the counter structure of the lid.

5. The method of claim 1, wherein the second liquid port is disposed along a line extending from a center of the swing bar to the counter structure through the first liquid port.

6. The method of claim 5, wherein the second liquid port is closer to the counter structure than the swing bar.

7. The method of claim 5, wherein the gas port is disposed along the line closer to the swing bar than the first liquid port.

8. The method of claim 1, wherein the first liquid port includes a raised seal structure.

9. The method of claim 8, wherein the raised sealing structure is taller than the sealing ring.

10. The method of claim 8, wherein the second liquid port has a second raised sealing structure.

11. The method of claim 10, wherein the second raised sealing structure is the same height as the raised sealing structure of the first liquid port.

12. The method of claim 8, wherein the gas port includes a third raised sealing structure.

13. The method of claim 12, wherein the third raised sealing structure is shorter than the raised sealing structure of the first liquid port.

14. The method of claim 1, wherein the lid connects to the lower portion with a threaded connection.

* * * * *